Figure 1:
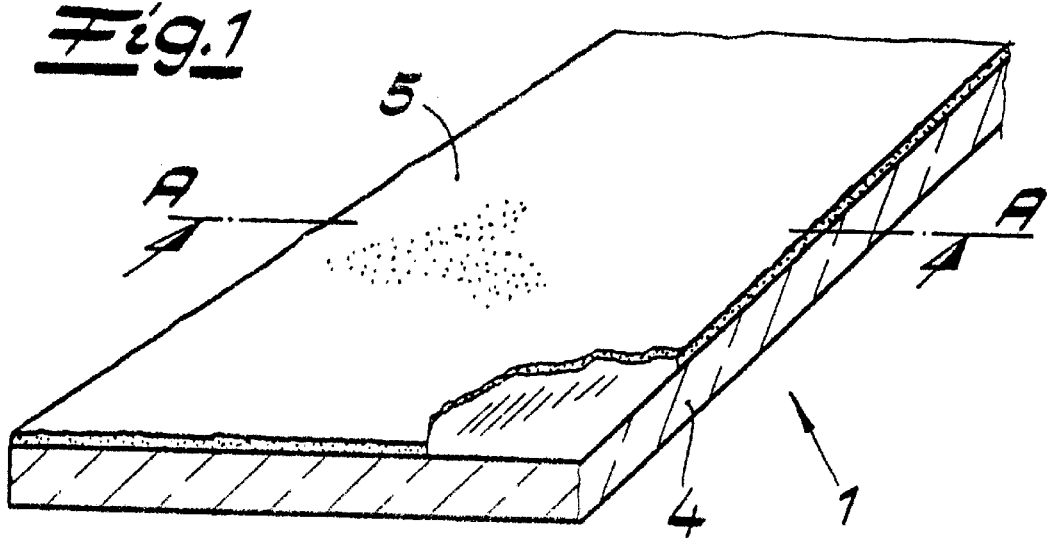

United States Patent
Böe

[19]

[11] Patent Number: 6,015,622
[45] Date of Patent: *Jan. 18, 2000

[54] SEMI-FINISHED SURFACE-CLADDING COMPONENT

[76] Inventor: Hans Peter Böe, Speldorfer Strasse 17-19, D-46049, Oberhausen, Germany

[ * ] Notice: This patent is subject to a terminal disclaimer.

[21] Appl. No.: 08/930,977

[22] PCT Filed: Feb. 13, 1997

[86] PCT No.: PCT/EP97/00656

§ 371 Date: Oct. 9, 1997

§ 102(e) Date: Oct. 9, 1997

[87] PCT Pub. No.: WO97/30246

PCT Pub. Date: Aug. 21, 1997

[30] Foreign Application Priority Data

Feb. 16, 1996 [DE] Germany .......................... 196 05 806
Aug. 10, 1996 [DE] Germany .......................... 196 32 353

[51] Int. Cl.[7] ................................ B32B 17/06; E04C 1/00
[52] U.S. Cl. .......................... 428/426; 428/70; 428/702; 428/441; 52/309.1; 52/309.3; 52/309.17
[58] Field of Search .............................. 428/426, 70, 702, 428/703, 441; 52/309.1, 309.3, 309.17, 506.01

[56] References Cited

U.S. PATENT DOCUMENTS

| | | | |
|---|---|---|---|
| 4,197,225 | 4/1980 | Emmons et al. | 260/233 A |
| 4,460,720 | 7/1984 | Gaidis et al. | 524/5 |
| 4,525,500 | 6/1985 | Lynn | 524/5 |
| 4,762,867 | 8/1988 | Flofin et al. | 524/5 |
| 5,026,576 | 6/1991 | Benvenuto et al. | 427/355 |
| 5,763,090 | 6/1998 | Boe | 428/428 |

FOREIGN PATENT DOCUMENTS

| | | |
|---|---|---|
| 0 722 027 A1 | 7/1996 | European Pat. Off. . |
| 778 858 | 3/1935 | France . |
| 818408 | 10/1951 | Germany . |
| 869312 | 3/1953 | Germany . |
| 2451692 | 5/1976 | Germany . |
| 3418002 | 11/1985 | Germany . |
| 44 32 051 C1 | 2/1996 | Germany . |
| 1553585 | 10/1979 | United Kingdom . |
| 2 107 211 | 4/1983 | United Kingdom . |

OTHER PUBLICATIONS

Database WPI Week 9527 JP 07 119 262 A (MIYA) Abstract.

Chemical Abstracts, vol. 90, 22, 28 May Abstract No. 173643y W. Rutledge.

Database WPI Week 8546, JP 60 195 049 A (MARINAX) Abstract.

Primary Examiner—Timothy Speer
Assistant Examiner—Stephen Stein
Attorney, Agent, or Firm—Herbert Dubno

[57] ABSTRACT

A construction element for cladding of a structural surface which consists of a glass pane and a layer of bonding mortar on one side of the glass pane, which bonding mortar consists of a fine-particle neutral aggregate and cement and is gauged with an aqueous dispersion of a polyacrylic acid derivative, whereby the polyacrylic acid derivative has a logarithmic decrement determined in accordance to DIN 53445, which has a maximum at Celsius temperatures below 0° C., and the bonding mortar is hardened on the glass pane with a deficiency of hydration water. The construction element is bonded to the surface to be cladded with the adhesive or by contact of the bonding mortar layer with setting concrete of the structure which is cladded with the element.

14 Claims, 1 Drawing Sheet

SEMI-FINISHED SURFACE-CLADDING COMPONENT

The invention relates to a semi-finished construction component, which is designed for covering surfaces. The surfaces can be interior or exterior surfaces of buildings, e. g. a house, wall surfaces or the like. But the surface can also be the surface of a semi-finished element, for instance a steel plate, a sheet-metal plate, a cement fiber board, timber board in the form of a fiber plate or a particle board, or also a plate of insulating material. The purposes of surface covering can be various. There can be decorative surface coverings or covering selected for the purpose of protection against corrosion. It can also be applied to a concrete plate. The surface can be a flat surface, or it can be a singly or doubly curved surface. In case a curved surface has to be covered, it is self-understood that the semi-finished construction component has to be provided with the same curvature as the surface.

Semi-finished construction elements designed for the covering of surfaces are known per se. For instance tesserae are known, which are attached to a surface product and which on the side facing away from the mosaic tile are provided with an adhesive layer covered with a protective membrane. When this protective membrane is removed, the tesserae can be applied to a wall or the like. However so far it has been impossible to apply glass panes in the form of float glass panes, prestressed glass panes, insulating glass units or safety glass units without further ado to a surface to be covered. For this type of attachment rather special technologies are required.

It is the object of this invention to solve the technical problem of covering surfaces with glass panes, which can be attached in a simple manner as surface-cladding components.

The solution of this technical problem consist in a semi-finished construction component designed for covering surfaces, comprising a glass pane and a bonding mortar layer on one side of the glass pane, which bonding mortar layer consists of a fine-particle neutral aggregate and cement and is gauged with an aqueous dispersion of a polyacrylic acid derivative, whereby the polyacrylic acid derivative has a logarithmic decrement, determined according to DIN 53445, which is at a maximum at temperatures of less than 0° Celsius, and wherein the bonding mortar sets on the pane of glass with a deficiency in hydration water, whereby the bond with the surface to be clad is achieved through the contact of the bonding mortar layer with the gauged and setting concrete, or with the help of a so-called tile-adhesive or any other concrete adhesive.

In the known methods of covering building surfaces with glass, first the concrete body is prepared, which means that regularly the concrete is poured into a corresponding casing and one has to wait until the concrete sets. Only after the concrete has hardened, the concrete body is provided with one or more glass plates. In this connection, it is known to attach the glass pane to the concrete body with the help of mechanical means. This kind of mechanical attachment is very expensive. Besides in the interstice between glass pane and concrete undesirable humidity, for instance condensation water, can very easily collect. Furthermore it is known to fasten the glass panes to the concrete body by adhesives, for instance a synthetic resin adhesive. Such types of assembly are also expensive. It is especially disturbing that the hazard-free life span of such a glass pane attached to a concrete surface is relatively short. When it is attached with the help of a synthetic resin adhesive, this adhesive can age and thereby fail, often in relatively short time periods, depending on climate conditions. As a result the glass panes detach themselves prematurely, at least partially. Insofar it is difficult to satisfy the safety regulations issued by the respective authorities. By contrast, the semi-finished construction components of the invention do not create any difficulties.

Further it is known (AT Patent 196 079) to produce colored covering plates made of glass with an adhesive layer. Here, for the simultaneous formation of the adhesive and the color layer, onto the glass plate an aqueous synthetic resin dispersion of polyvinyl acetate is sprayed, containing approximately 15 to 20% of solid materials, with the addition of a softener and a dye. Sand is then spread over this first layer, in order to protect the synthetic layer from damage, e.g. during transport. The sand layer serves also to insure the strength of the adhesion of the glass plate to the cement mortar by means of which the plates will be finally attached to a wall. The heretofore known methods are expensive, since various layers have to be applied to the glass plate. Besides the adhesion is also questionable.

Within the framework of the invention there are several possibilities for further development and configurations of the semi-finished construction components. According to a preferred embodiment of the invention, the glass panes have a thickness of 4 mm and more, preferably a thickness from approximately 4 to 8 mm. The glass panes can consist of nonprestressed glass, but preferably consist of prestressed glass. They can be simple glass panes or composite glass panes. According to the preferred embodiment of the invention, the glass panes are executed as float glass panes. It also lies within the framework of the invention that the glass panes be provided with a screen layer, on which screen layer the bonding mortar is applied. The bonding mortar adheres sufficiently strong to the glass pane also in the case of interposed screen layer. The maximal size of the glass pane should be within the range of 4000 mm×4000 mm. The glass pane can also be a glass insulation unit. It is also within the framework of the invention to execute the glass pane as a solar element in the form of a solar glass pane.

Within the framework of the invention, mortar can be defined as a bonding construction material for the bond between the glass and the concrete. The concrete layer of the mortar can be applied to the glass pane by spraying, rolling, by trowel or other similar operations. Hardening of the mortar means "sufficient" hardening. The layer of bonding mortar is not allowed to be too stiff or too rigid. This way the applied mortar layer remains capable for a long period of time to bond with fresh, not yet hardened concrete. The added polyacrylic acid derivative also contributes to an optimal bonding with the concrete. According to a preferred embodiment of the invention, the layer of bonding mortar has a layer thickness of 2 to 7 mm, preferably 4 to 6 mm.

Preferably the bonding mortar has a fine-particle neutral aggregate with a granulation of 0.1 to 1 mm, preferably 0.2 to 0.7 mm. Suitably quartz sand or also glass powder are used as fine-particle neutral aggregates. According to a preferred embodiment of the invention, the cement is Portland cement. It is within the framework of the invention that the cement, preferably the Portland cement be dyed. This way when transparent glass panes are used, it is possible to obtain colored facades with special esthetic effects.

Within the framework of the invention, polyacrylic acid derivatives mean particularly polymers based on acrylates, i.e. acrylic acid esters and their derivatives, acrylic acid or acrylonitrile being the chain components. The polyacrylic acid derivative can also be a copolymer, wherein particularly acrylates, acrylic acid or acrylonitrile are used as comonomers. Methacrylic acid and its derivatives can also be used as comonomers. It is also within the framework of the invention to prepare the polyacrylic acid derivative as a polymer mixture of various polyacrylic acid derivatives, as defined in claim 1. According to a preferred embodiment of the invention, which has special importance within the framework of the invention, the polyacrylic acid derivative is a polyacrylate, preferably an acrylic resin. It is within the framework of the invention to mix polyacrylate adhesives into the bonding mortar. According to a preferred embodiment of the invention the polyacrylic acid derivative, preferably polyacrylate, is a copolymer with acrylonitrile as a comonomer. Suitably the proportion of the acrylonitrile comonomer in relation to the polyacrylic acid derivative, preferably polyacrylate, amounts thereby to at least 2% by weight. The bonding mortar is gauged with an aqueous dispersion, for instance an aqueous emulsion of the polyacrylic acid derivative.

According to the invention the polyacrylic acid derivative has a logarithmic decrement, determined according to DIN 53445 with the polyacrylic acid derivative as test substance. Preferably a polyacrylic acid derivative is used whose logarithmic decrement reaches a maximum at Celsius temperatures of over −8° C. It is known (see for instance German patent 28 27 382) to include in a bonding agent for the production of concrete or mortar a synthetic material, whose logarithmic decrement according to DIN 53445 passes through a maximum at Celsius temperatures below −8° C. The purpose of such measures is to create mixtures of construction materials for components an facings which are exposed to temperatures below 0° C., but nevertheless have sufficient elastoplasticity and insure an advantageous shock-damping and abrasion resistance.

The invention is based on the concept that a polyacrylic acid derivative, whose logarithmic decrement according to DIN 53445 reaches a maximum at Celsius temperatures below 0° C., works as an effective bonding intermediary, not only in the temperature range below 0° C., but surprisingly also especially within the range of −50° C. +200° C. as part of the bonding mortar of the invention between glass pane and the layer of bonding material. Even at a temperature of over 300° C. a gradual reduction of the adhesion effect can be seen only after an exposure of more than 30 minutes to these temperatures. Surprisingly even relatively high temperatures, such as due to strong solar exposure or fire, do not impair the adhesion effect of the glass plate to the concrete body. Insofar the effective adhesion is not sensitive to climate changes or heat expansion of the glass panes. However the person skilled in the art could not expect that on the one hand such a strong and heat-sensitive bond is achieved between the coating and the glass pane, and that on the other hand it is also possible to have heat expansion of the glass panes without fissure formation.

The semi-finished construction component of the invention is furthermore characterized by its excellent impermeability with regard to the penetration of liquids and gases. To this extent the semi-finished construction components of the invention are also very suitable for cladding of buildings for protection against the negative effects of liquids and/or gases.

The strong bond between coating and glass pane is evidently achieved due to a molecular interaction between the polyacrylic acid derivative and the glass. It is presumed that through the cement, especially through the alkaline components of the cement, the glass surface is so to speak microscopically roughened, so that a larger surface is created for an interaction with the molecular components of the polyacrylic acid derivative. During this roughening in the glass surface free silanol groups can be formed, which are capable to interact chemically and/or physically with the functional groups of the acrylic acid monomer units. Presumably here relatively strong stable hydrogen bridge linkages are formed between these functional groups and the silanol groups of the glass surface. The person skilled in the art could not expect that such effective physico-chemical interactions are possible between an organic polyacrylic polymer and the anorganic glass material, and that this way such a strong adhesion of the glass pane can be achieved. In spite of this strong adhesion between glass pane and coating, surprisingly the bonding mortar does not obviously attack the glass pane. Within the framework of the invention special attention is given to an embodiment wherein the contained cement is Portland cement gauged with an aqueous dispersion of a polyacrylate, which polyacrylate is a copolymer with acrylonitrile as comonomer. It is presumed that the alkaline components of the Portland cement slightly etch the surface of the glass pane, thereby producing a particularly effective microscopic roughening, so that a very pronounced interaction takes place between the glass surface, respectively the therein formed silanol groups, and the carboxyl and/or nitrile groups of the polyacrylate copolymers. Particularly good results are achieved with glass panes of float glass.

According to the invention the glass pane is in contact with concrete on the coating side before the hardening of the concrete, whereby the concrete bonds monolithically with the coating of the glass pane. The feature of "monolithic bonding" expresses the fact that the bond was not created with the assistance of an additional adhesive, which is applied to the surface of the concrete body to be covered by the glass pane or to the glass pane, respectively to the bonding mortar coating of the glass pane. The monolithic bond is created when the glass pane is in contact with the not yet hardened concrete. The bond is monolithic because during the hydration of the bonding mortar, the crystallites of the concrete grow—so to speak—into the bonding mortar which forms the coating, and bond with the crystallites in the coating, since there a hydration can still take place, which is based on the fact that the bonding mortar is hardened on the glass pane with a deficiency of hydration water and therefore is still capable of being hydrated. It is self-understood that the hydration water for the bonding mortar originates from the aqueous dispersion of the polyacrylic acid derivative. But it is also within the framework of the invention that optionally additional hydration water can be added during the gauging of the bonding mortar, but always following the rule that the bonding mortar has to be hardened on the glass pane with a deficiency of hydration water, thereby leaving it still capable to be hydrated. It is also possible that hydration water from the not yet hardened concrete can diffuse into the bonding mortar layer and this way an additional hardening of the bonding agent coating can take place. The polymer plastic material in the bonding mortar does not contribute to the monolithic bond, if it also presumably supports the growing of the crystallites of the concrete into the coating.

The polyacrylic acid according to feature 1.2) makes possible to set up the bonding mortar by selecting its proportion of polyacrylic acid derivative and the thickness of the coating so that in the hardened state it participates in the heat expansion of the glass pane without cracks. The polyacrylic acid derivative imparts to the bonding mortar of the coating the elasticity which it needs to participate in the heat expansion without cracking. According to a preferred embodiment of the invention, the aqueous dispersion of the polyacrylic acid derivative contains 50–65% by weight, preferably 55–60% by weight of the polyacrylic acid derivative and 35–50% by weight, preferably 40 to 45% by weight water. If a polyacrylate is used within the framework of the invention, the construction work produced according to the invention is characterized by an especially good long-term behavior. According to a preferred embodiment of the invention, a bonding mortar mixed with the following proportions has proven itself in practice:

fine particle neutral aggregate: 10 to 40% by weight
cement: 10 to 40% by weight
aqueous dispersion of the polyacrylate derivative: 10 to 40% by weight.

It is self-understood that the percentage by weight always adds up to 100% in a mixture according to the invention.

Preferably the bonding mortar is mixed with the proportion of 25 to 35% by weight of fine-particle neutral aggregate, 25 to 35% by weight cement and 25 to 35% by weight of the aqueous dispersion of the polyacrylic acid derivative. As already mentioned, the amount of the hydration water in the bonding mortar is always selected so that the bonding mortar hardens on the glass pane with a deficiency of hydration water. It is self-understood that the thickness of the glass pane coating is such that a sufficient stress reduction takes place towards the concrete body, when the glass pane is subject to heat expansion, while the heat expansion of the concrete in itself remains minimal. Regarding the layer thickness to be selected, an embodiment of the invention has proven itself in practice, where the layer of bonding mortar has a layer thickness of 2 to 7 mm, preferably 4 to 6 mm.

The invention starts out from the finding that in a glass pane a coating of bonding mortar of the described structure can on the one hand be effectively and durably bonded to the glass surface, while on the other hand the coating can follow the heat expansion of the glass pane through elastic deformation, and therefore without cracking. Further the invention starts out from the surprising finding that a coating of such a bonding mortar with the concrete results in a monolithic bond, thereby providing an unexpectedly strong attachment between the coating and the concrete body. This way the glass pane can remain attached to the concrete body for a long time, without the mechanical constraints impairing the durability.

It is also within the framework of the invention to apply the layer of bonding mortar on both sides of the glass pane. In this embodiment of the invention the semi-finished construction component is actually inserted as a connecting layer and/or sealing layer between the surfaces assigned to the two sides of the glass pane, whereby the two surfaces are brought into contact with the two bonding mortar layers of the semi-finished construction component. This semi-finished construction component provided with two layers of bonding mortar can be inserted in an advantageous manner for sealing purposes between two surfaces. Preferably this semi-finished construction component is inserted between a concrete surface and a bitumen surface, as a sealing element. The gaps being formed this way between the individual semi-finished construction components can be sealed advantageously by the strips of the semi-finished construction component reaching over the gaps.

Figure 2:
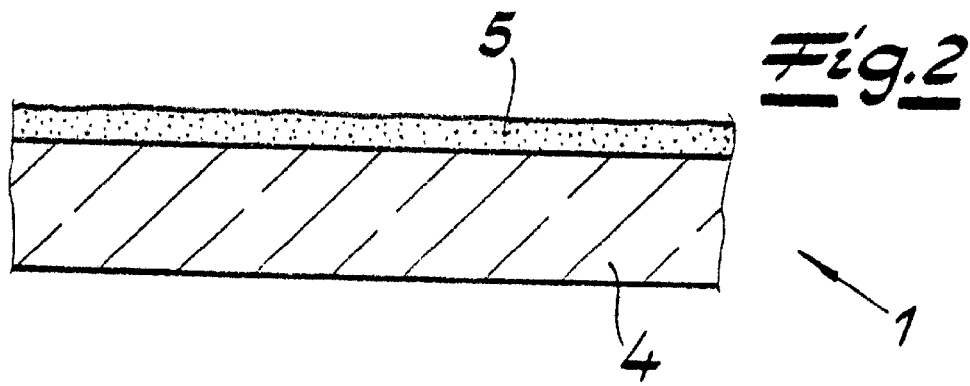
Figure 3:
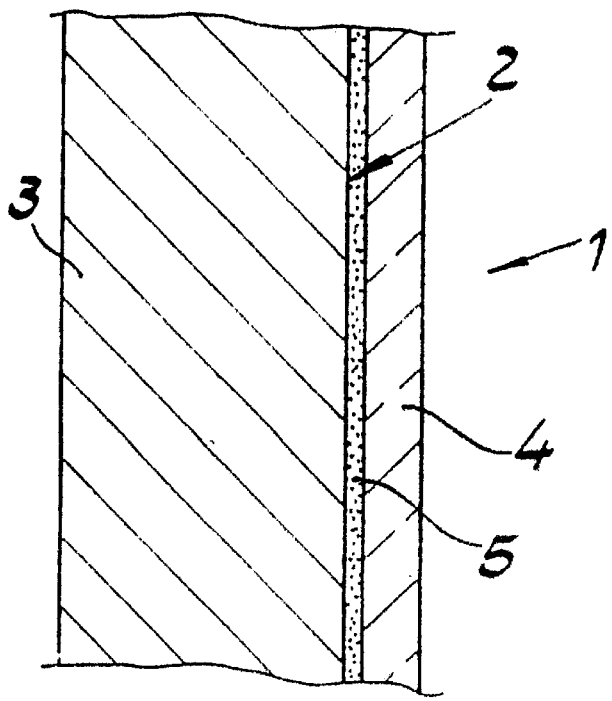

The invention is subsequently closer described with the aid of a drawing showing only one embodiment example. It shows in schematic representation:

FIG. 1 the front view of a semi-finished construction element according to the invention, in a cutout and partially broken off, FIG. 2 a section in the direction A—A through the object of FIG. 1 on a larger scale, FIG. 3 a semi-finished construction component according to the invention, in a section corresponding to FIG. 2, after attachment to a surface to be clad.

The semi-finished construction component 1 shown in a cutout in the figures is designed for covering surfaces 2. These can be flat or curved surfaces. The embodiment example refers only to a flat surfaces 2, which can be part of a concrete wall 3 and steel wall. If a curved surface has to be covered, the semi-finished construction component 1 will be curved corresponding to these surfaces.

In its basic construction the semi-finished component 1 consists of a glass plate 4 and a bonding mortar layer 5. The bonding mortar layer 5 has a particular structure, namely as defined in patent claim 1 and the dependent claims relating to the bonding mortar layer. Through the selection of its content of polyacrylic acid derivative and the thickness of the layer, the bonding mortar is set up so that heat expansions of the glass pane 4 are followed without cracks by the bonding mortar layer 5, and that different heat expansions between the glass pane 4 and the construction component 3 to which the surface 2 pertains are compensated.

I claim:

1. A construction component for cladding of a structural surface, consisting of
    a glass pane and a layer of bonding mortar on one side of the glass pane, which bonding mortar consists of a fine-particle neutral aggregate and cement and is gauged with an aqueous dispersion of a polyacrylic acid derivative,
    whereby the polyacrylic acid derivative has a logarithmic decrement determined in accordance to ISO 537, which has a maximum at Celsius temperatures below 0° C., and the bonding mortar is hardened on the glass pane with a deficiency of hydration water,
    whereby a bond with the surface to be covered can be established through the contact of the bonding mortar layer with gauged and setting concrete of the surface or with a tile adhesive.

2. The construction component according to claim 1 wherein the glass pane has a thickness of substantially 4 to 8 mm.

3. The construction element according to claim 1 wherein the glass pane is a prestressed glass pane.

4. The component according to claim 1 wherein the glass pane is a float glass pane.

5. The construction component according to claim 1 wherein the bonding mortar layer has a layer thickness of 2 to 7 mm.

6. The construction component according to claim 1 wherein the bonding mortar including a fine-particle neutral aggregate with a granulation of 0.1 to 1 mm.

7. The construction component according to claim 1 wherein the cement is Portland cement.

8. The construction element according to claim 1 wherein the polyacrylic acid derivatives is an acrylic resin.

9. The construction component according to claim 1 wherein the polyacrylic acid derivative is a copolymer with acrylonitrile as a comonomer.

10. The construction component according to claim 9 wherein the polyacrylic acid derivative contains a proportion of acrylonitrile comonomer of at least 2% by weight.

11. The construction component according to claim 1 wherein the polyacrylic acid derivative is an aqueous dispersion containing 50 to 65% by weight polyacrylic acid derivative and 35 to 50% by weight water.

12. The construction component according to claim 1 wherein the bonding mortar is prepared with the following mixing proportion:

fine-particle neutral aggregate: 10 to 40% by weight cement: 10 to 40% by weight aqueous dispersion of the polyacrylic acid derivative: 10 to 40% by weight.

13. The construction component according to claim 1 wherein the bonding mortar is prepared with a mixing proportion of 25 to 35% by weight fine-particle neutral aggregate, 25 to 35% by weight cement and 25 to 35% by weight of an aqueous dispersion of the polyacrylic acid derivative.

14. The construction component according to claim 1 wherein the bonding mortar layer on the glass pane has a content of polyacrylic acid derivative and a coating thickness so that the bonding mortar layer follows thermal expansion of the glass pane without cracking.

* * * * *